Dec. 15, 1953

J. M. MILLER 2,662,412

PORTABLE POWER UNIT

Filed Sept. 20, 1950

Inventor

John M. Miller

By Clarence A. O'Brien
and Harvey B. Jacobson
Attorneys

Dec. 15, 1953  J. M. MILLER  2,662,412
PORTABLE POWER UNIT
Filed Sept. 20, 1950  2 Sheets-Sheet 2
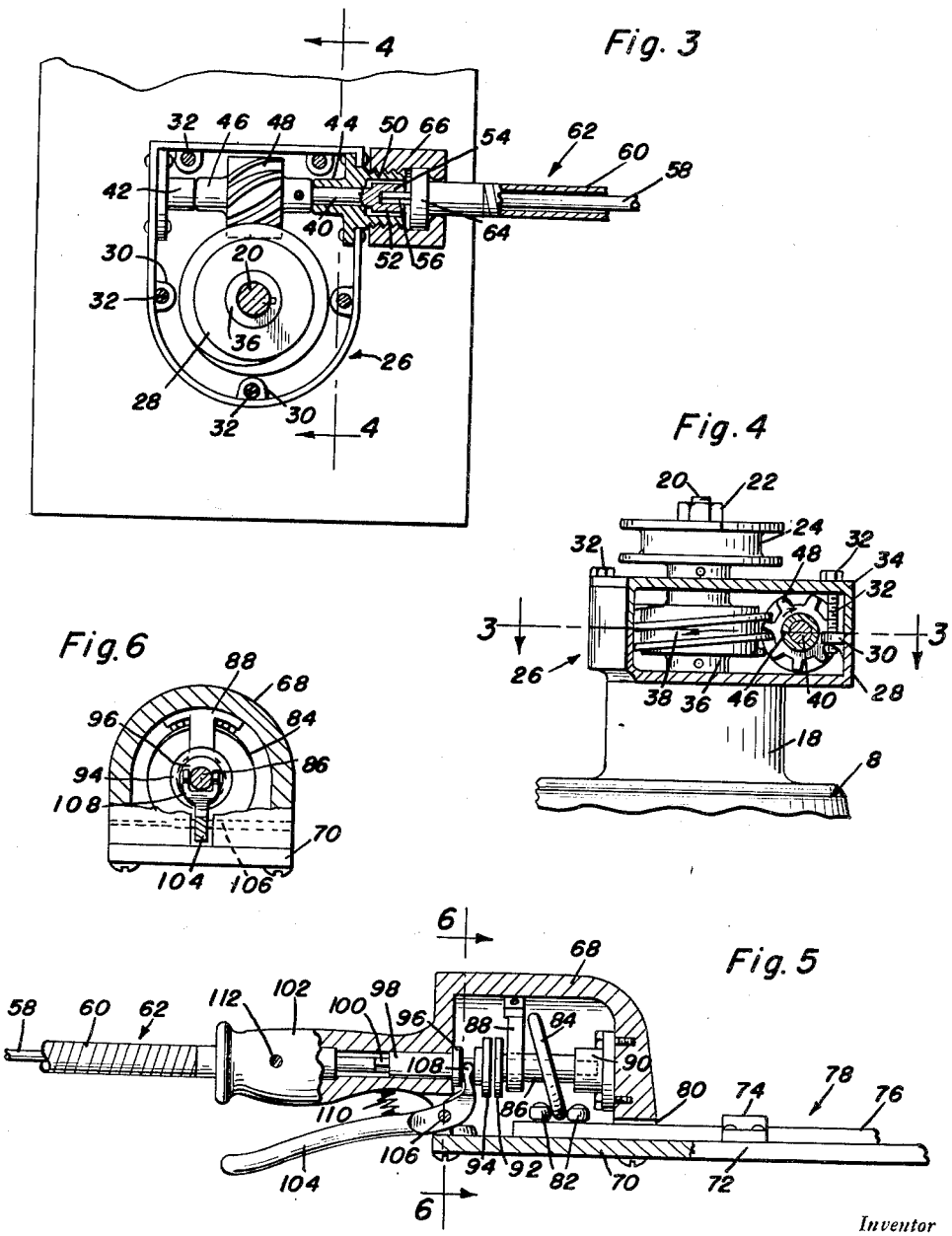
Inventor
John M. Miller
By Clarence A. O'Brien
and Harvey B. Jacobson
Attorneys

Patented Dec. 15, 1953

2,662,412

UNITED STATES PATENT OFFICE 2,662,412

PORTABLE POWER UNIT

John M. Miller, Summerdale, Ala.

Application September 20, 1950, Serial No. 185,892

3 Claims. (Cl. 74—16)

The present invention relates to certain new and useful improvements in mower-type power-driven shears for trimming hedges, bushes and the like and has more particular reference to a portable power unit, a flexible power transmission shaft, means for delivering the power from said unit to said shaft, and readily and easily controllable shears on the working end of the flexible shaft.

An object of the invention is to structurally, functionally and otherwise simplify and improve on apparatus of the class stated, this through the medium of practical refinements and adaptations in the over-all construction.

Another object of the invention is to provide an apparatus or machine as stated in which manufacturers and users will find their essential needs fully met, contained and aptly and suitably available.

More specifically, one phase of the invention has to do with a portable power unit wherein the engine or motor thereof has the usual starter pulley atop the upper available end of the drive shaft, said pulley being spaced above the casing to make room for a novel and practical power take-off device, which latter is installed on the shaft between the pulley and casing.

It is also an object of the invention to provide a power take-off device which is in the nature of an attachment and which is applicable to a substantially conventional-type portable power unit simply by extending the drive shaft to elevate the pulley and to make room for said attachment.

Novelty is also predicated on the aforementioned power take-off attachment in that the latter is characterized by a simple and practical sectional housing with appropriate gearing therein and with a driven or power take-off shaft which has a screw-threaded neck projecting through the rim of the housing to facilitate coupling one end of a flexible shaft to the power take-off shaft whenever necessary or desired.

In addition to the above, novelty is predicated on a hollow head having a hollow handle, said head carrying a reciprocable cutter bar and a fixed complemental cutter guard, said head and handle having novel lever controlled clutch means and, in addition, being provided with a wobble wheel shaft for converting the rotary motion of the flexible shaft to the reciprocating motion for the stated reciprocable cutter bar.

Other objects and advantages will become more readily apparent from the following description and the accompanying illustrative drawings.

In the accompanying drawings, wherein like numerals are employed to designate like parts throughout the views:

Figure 3 is a fragmentary view in section and elevation showing the power take-off device or means, said view being taken approximately on the horizontal line 3—3 of Figure 4, looking in the direction of the arrows;

Figure 4 is a view taken on a line at right angles; namely, the line 4—4 of Figure 3, looking in the direction of the arrows;

Figure 5 is a fragmentary sectional and elevational view showing the details of construction of the head and handle means utilized in the construction of the mower-type shears; and Figure 6 is a view in section and elevation taken on the vertical line 6—6 of Figure 5, looking in the direction of the arrows.

Figure 1:
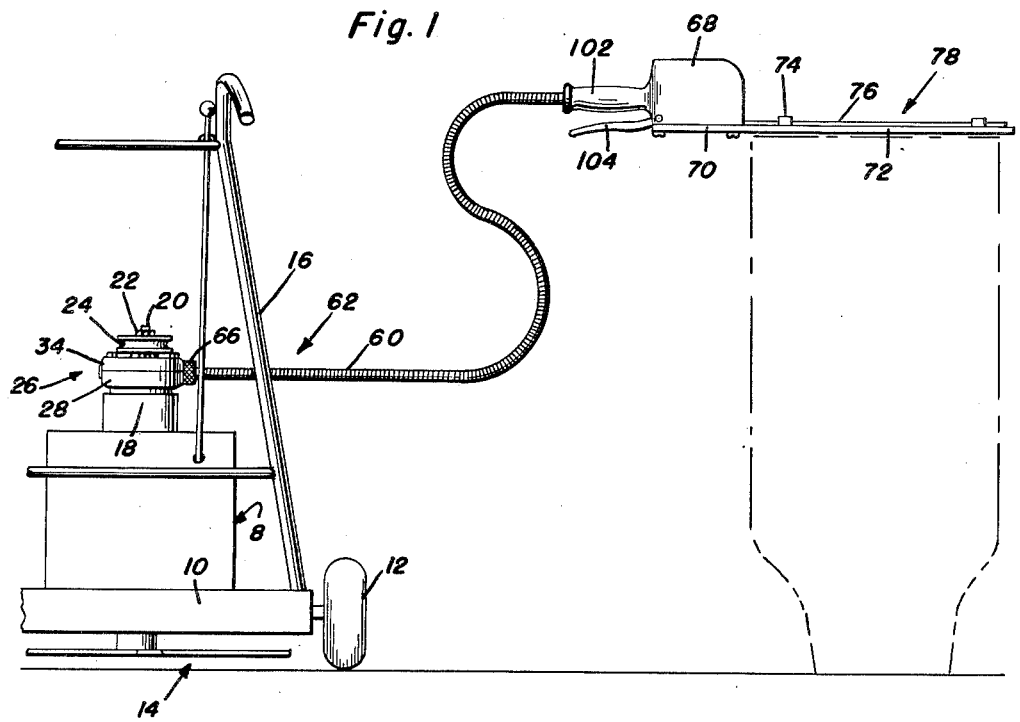
Figure 1 is an elevational view of the complete machine or apparatus constructed in accordance with the principles of the invention and illustrating the manner in which the hedge trimming shears are positioned for use.
Figure 2:
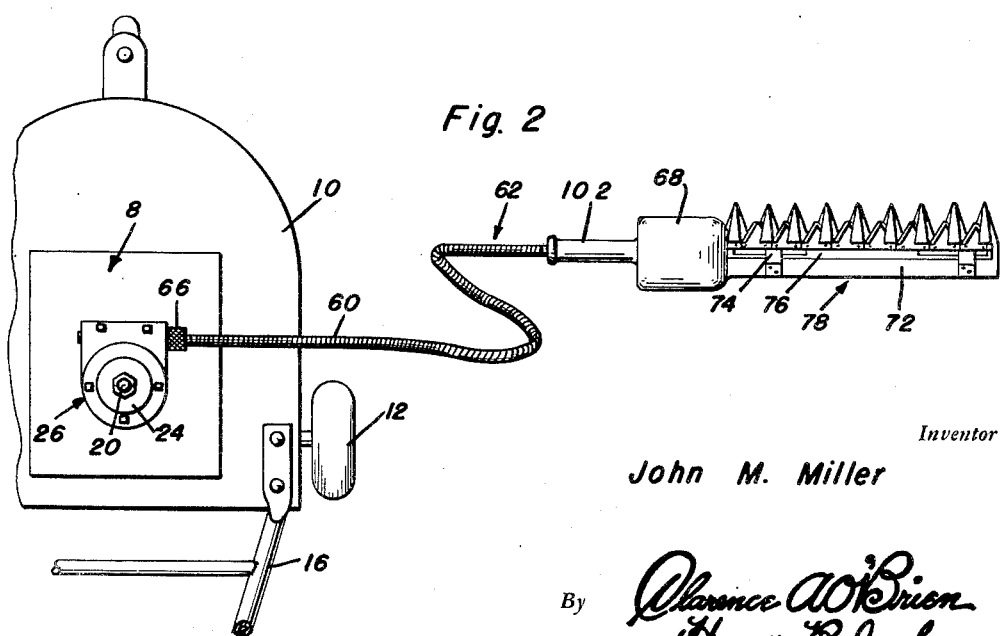
Figure 2 is a top plan view of the apparatus shown in Figure 1 with the power unit fragmentarily shown.

Referring now to the portable prime mover or power unit in Figures 1 and 2, said unit is denoted generally by the numeral 8. The unit includes a frame 10, supporting wheels 12, a rotary bladed cutter 14 below the frame, handle means 16 and casing means 18. The upper end of the drive shaft from the engine or motor (not shown) is denoted by the numeral 20 and is provided with a nut 22 securing a starter pulley 24 in place. Normally, the shaft 20 extends just a short distance above the casing head 18. However, in the instant situation, the shaft is lengthened to provide space between the pulley and casing head to accommodate the power take-off means herein shown.

The means referred to is best shown in Figures 3 and 4. Said means may be construed as an attachment. On the other hand, it is within the purview of the invention to build this particular type of power take-off in the machine at the time of original construction. In any event, the power take-off attachment or means is characterized by a suitable sectional housing or gear box 26. This comprises a lower shell or section having an upstanding rim 28 provided with circumferentially spaced screw-threaded lugs 30 to accommodate assembling and retaining bolts 32 which secure the upper section 34 to the lower section 28. Both sections have rims and the rim portions are in abutting relationship, as best shown in Figure 4. A vertical sleeve 36 is keyed on the extended shaft and confined in the housing and provided with a worm 38. As shown in Figure 3, the right angular auxiliary take-off shaft 40 is in a horizontal plane and is journaled for rotation in bearings 42 and 44 suitably mounted in the housing. A sleeve 46 is keyed on the shaft and provided with a worm gear 48 in mesh with the worm 38. The bearing 44 has an extended externally screw-threaded neck 50 which projects beyond an aperture in the rim portion of the housing, as shown. The power take-off shaft 40 is also provided with an extension which takes the form of a coupling 52 and this is rotatable within the confines of the screw-threaded neck 50. It has a polygonal socket 54 to accommodate the correspondingly shaped drive-end 56 on the flexible shaft 58. The flexible shaft has the usual flexible covering 60. The flexible shaft, as a unit, is denoted by the numeral 62. The covering has a flange fitting 64 thereon which is mounted in an internally screw-threaded attaching cap or cup 66. The latter is screwed to the neck and thus provides the desired separable coupling or connection between the flexible shaft 62 and the power take-off shaft 40. When the flexible shaft is detached, an imperforate screw cap (not shown) is fastened on the neck 50 for obvious purposes.

Referring now to the other end of the flexible shaft 62, attention comes to the implement or tool referred to as the mower type trimmer or shears. This tool comprises a hollow head 68 of the cross-section shown in Figure 6. The head is open at the bottom and said open bottom is closed by an end portion 70 of the fixed cutter guard 72. The cutter guard is provided with a guide bracket 74 for straddling the toothed reciprocable cutter bar 76 in place. The parts 72 and 76 constitute the mower type shears 78. The inner or left-hand end portion of the reciprocable cutter bar 76 extends through an aperture 80 into the interior of the head, where it is provided with pins carrying freely idling anti-friction rollers 82. These roller-equipped pins receive motion from a wobble wheel 84 on a shaft 86 journaled for rotation in bearings 88 and 90 in said head. The shaft 86 is provided with a friction disk 92 cooperable with a companion disk 94 forming a part of a sliding clutch 96. The clutch includes a sliding socket member 98 to accommodate the key 100 on the adjacent end portion of the flexible shaft. This end portion of the shaft is fitted into the bore of a hollow handle 102 forming a handle for the head. Opposed to the handle is the handle portion 104 of a clutch engaging and disengaging lever. The lever is pivoted in the head as shown at 106 and provided with a fork 108 which engages the flanged portion of the sliding clutch. The numeral 110 is a coiled spring interposed between the handles 102 and 104 and holding the clutch normally open. By grasping both handles and squeezing same together, the clutch is thrown in by engaging the disks 94 and 92 whereby to impart rotation to the wobble wheel shaft 86. Thus, rotary motion of the flexible shaft is converted into reciprocating motion for the cutter bar in an obvious manner. This novel handle and drive means as well as the flexible shaft means provides a satisfactory tool which may be conveniently handled by the user when trimming hedges, bushes and the like. It may be pointed out that the flexible shaft means is fitted and held in the bore of the handle by a set screw or the like 112.

It may be repeated by way of introduction to the claims that novelty is predicated on the overall assemblage or machine disclosed in Figures 1 and 2, on the power take-off means separately and in conjunction with the unit 8 and on the trimmer implement of Figures 5 and 6.

It is felt that the manner of attaching and detaching the flexible shaft and assembling the parts for use as well as the operation of the construction will be clear from the drawings.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A machine of the class described comprising a portable motor having a casing with a drive shaft projecting above said casing, a starter pulley keyed to the upper end of said shaft and spaced above said casing, a sleeve keyed on the shaft between the pulley and casing, said sleeve having a worm, a housing enclosing said sleeve and worm, said housing having bearings, a power take-off shaft in said housing and journaled for rotation in said bearings, said latter shaft having a worm gear in mesh with said worm and further having a coupling available for use through an opening provided therefor in said housing, one of the bearings having a screw-threaded neck projecting through and beyond said opening, said coupling being rotatable in said neck, a flexible shaft including a covering provided with a flanged fitting, and a jointing cup swively mounted on said flanged fitting and internally screw-threaded, said cup being screwed on said neck, said flexible shaft having separable connection with said coupling.

2. A power take-off attachment for application to a drive shaft between a motor casing and a starter pulley on said shaft, a gear housing embodying a hollow lower section and having an upstanding rim with internal screw-threaded lugs, and a complemental upper cover section with a rim resting on said first-named rim and having bolts screwed into said lugs, aligned bearings mounted in said housing, one of said bearings having a screw-threaded neck projecting through and beyond said rims, a shaft in said housing mounted for rotation in said bearings and having a coupling rotatable in said neck, a worm gear secured on said shaft, a sleeve in said housing at right angles to said shaft having a worm in mesh with said worm gear.

3. The structure of claim 2, and a flexible shaft having a covering with a flanged fitting, and a screw-cap swivelled on said fitting and adapted to be coupled with said neck.

JOHN M. MILLER.

References Cited in the file of this patent

UNITED STATES PATENTS

| Number | Name | Date |
|---|---|---|
| 1,316,529 | Basel | Sept. 16, 1919 |
| 1,352,326 | Swatzell | Sept. 7, 1920 |
| 1,357,444 | Cox | Nov. 2, 1920 |
| 1,478,372 | Edelen | Dec. 25, 1923 |
| 1,517,240 | Albertson | Dec. 2, 1924 |
| 1,552,572 | Scannell | Sept. 8, 1925 |
| 1,693,707 | Dishmaker | Dec. 4, 1928 |
| 1,878,549 | Sireci | Sept. 20, 1932 |
| 2,268,221 | Mischaker | Dec. 30, 1941 |
| 2,368,731 | Snyder | Feb. 6, 1945 |

FOREIGN PATENTS

| Number | Country | Date |
|---|---|---|
| 391,762 | France | Sept. 5, 1908 |